United States Patent
Bottleson et al.

(10) Patent No.: US 9,442,826 B2
(45) Date of Patent: Sep. 13, 2016

(54) KERNEL FUNCTIONALITY CHECKER

(71) Applicant: Intel Corporation, Santa Clara, CA (US)

(72) Inventors: Jeremy Bottleson, Rancho Cordova, CA (US); Alfredo Gimenez, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,734

(22) PCT Filed: Mar. 14, 2013

(86) PCT No.: PCT/US2013/031346
§ 371 (c)(1),
(2) Date: Jun. 19, 2013

(87) PCT Pub. No.: WO2014/142876
PCT Pub. Date: Sep. 18, 2014

(65) Prior Publication Data
US 2015/0121051 A1 Apr. 30, 2015

(51) Int. Cl.
*G06F 9/44* (2006.01)
*G06F 11/36* (2006.01)
*G06F 9/30* (2006.01)
*G06F 9/54* (2006.01)

(52) U.S. Cl.
CPC ....... *G06F 11/3664* (2013.01); *G06F 9/30065* (2013.01); *G06F 9/544* (2013.01); *G06F 9/545* (2013.01); *G06F 11/3624* (2013.01); *G06F 2201/865* (2013.01)

(58) Field of Classification Search
USPC .......................................... 717/124
See application file for complete search history.

(56) References Cited

U.S. PATENT DOCUMENTS

| | | | | |
|---|---|---|---|---|
| 5,799,183 | A * | 8/1998 | Iwashita | G06F 12/08 |
| 2003/0188225 | A1* | 10/2003 | Bates et al. | 714/38 |
| 2010/0192130 | A1 | 7/2010 | Hawblitzel et al. | |
| 2010/0332473 | A1 | 12/2010 | Brodsky et al. | |
| 2011/0214017 | A1 | 9/2011 | Lupu et al. | |
| 2012/0066664 | A1 | 3/2012 | Howard | |
| 2013/0300752 | A1* | 11/2013 | Grover et al. | 345/520 |

FOREIGN PATENT DOCUMENTS

KR 102007010943 A 11/2007

OTHER PUBLICATIONS

Chen et al. (MATLAB*G: A Grid-Based Parallel MATLAB, National University of Singapore, dated 2004, retrieved on May 28, 2015, URL: http://citeseerx.ist.psu.edu/viewdoc/download?doi=10.1.1.11.2039&rep=rep1&type=pdf).*

(Continued)

*Primary Examiner* — Hang Pan
(74) *Attorney, Agent, or Firm* — Schwegman Lundberg & Woessner, P.A.

(57) ABSTRACT

A debugging system and method, referred to as a kernel functionality checker, is described for enabling debugging of software written for device-specific APIs (application program interfaces) without requiring support or changes in the software driver or hardware. Specific example embodiments are described for OpenCL, but the disclosed methods may also be used to enable debugging capabilities for other device-specific APIs such as DirectX® and OpenGL®.

23 Claims, 4 Drawing Sheets

(56) References Cited

OTHER PUBLICATIONS

Trefethen et al. (MultiMATLAB: MATLAB on Multiple Processors, Technical Report, Cornell University, 1996).*

"International Application Serial No. PCT/US2013/031346, International Search Report mailed Dec. 13, 2013", 3 pgs.

"International Application Serial No. PCT/US2013/031346, Written Opinion mailed Dec. 13, 2013", 5 pgs.

* cited by examiner

KERNEL FUNCTIONALITY CHECKER

This application is a U.S. National Stage Filing under 35 U.S.C. 371 from International Application No. PCT/US2013/034131, filed on Mar. 27, 2013, which is incorporated herein by reference in its entirety.

TECHNICAL FIELD

Embodiments described herein relate generally to computer software and to methods and systems for testing computer software.

BACKGROUND

Computer systems that include a combination of CPUs (central processing units), GPUs (graphics processing units), and other processors have become an important class of platforms. Industry standard frameworks have been developed for programming these so-called heterogeneous systems. One such framework is OpenCL (Open Computing Language). Development of software for such systems involves checking the functionality of portions of the code as part of a debugging process. Solutions for line-by-line debugging of programs for such systems has been limited, however, usually involving hardware-specific implementations.

DETAILED DESCRIPTION

Described herein is a debugging system, referred to as a kernel functionality checker, for enabling advanced debugging capabilities for OpenCL kernels running on different hardware without requiring support or changes in the software driver or hardware. The kernel functionality checker may include line-by-line debugging, runtime breakpoints, private, local, and global memory viewing and editing, runtime assertions/conditional breakpoints, work-item (thread) switching and stepping, local and global workgroup stepping, and edit-and-continue debugging for OpenCL kernels. The specific example embodiments described below are for OpenCL, but the disclosed methods may also be used to enable advanced debugging capabilities for other device-specific APIs (application program interfaces) such as DirectX® and OpenGL® (Open Graphics Library).

One embodiment of the kernel functionality checker utilizes a hybrid method of software-based and hardware-based OpenCL execution. In software, the necessary information to correctly run individual statements within the given OpenCL kernel in the correct order is determined, and those statements are then dispatched for execution to the OpenCL device. As a result, the OpenCL execution is controlled as if it were a software application and the statements may be run on hardware to achieve the same output as would be obtained when running the kernel entirely on the OpenCL device. The kernel functionality checker may support full control of kernel execution and allow the user to inspect all memory objects at every stage of kernel execution.

In one embodiment, the kernel functionality checker may be described as being made up of three basic components. A parser component, also referred to as the CL parser, is responsible for reading in a valid OpenCL kernel and then outputting valid micro-kernels and necessary meta-data. A driving application component, also referred to as the debug engine, receives the output from the parser and then is responsible for correctly running the kernel, handling all memory and kernel execution tasks. The third component is the user interface, which provides the user an interface by which to issue commands to the driving application as well as display output. In operation, a valid OpenCL kernel is first passed to the parser component, which performs semantic analysis of the kernel to generate a series of micro-kernels, each of which represents a set of instructions from the original kernel. In a typical use this set of instructions would be the instructions represented by a single line of source code in the original OpenCL kernel, but could also be a subset of the instructions represented by an individual source line to allow debugging of individual portions of a source line. In addition to generating these micro-kernels, the CL parser also extracts meta-data from the kernel for flow control, kernel arguments, private and local variables, and indices to map variables correctly for the driving application. The driving application component uses this output to provide a system for a user to step through execution of the kernel in various ways, including (but not limited to) line-by-line stepping and executing up to specified breakpoints.

Example System Description

Figure 1:
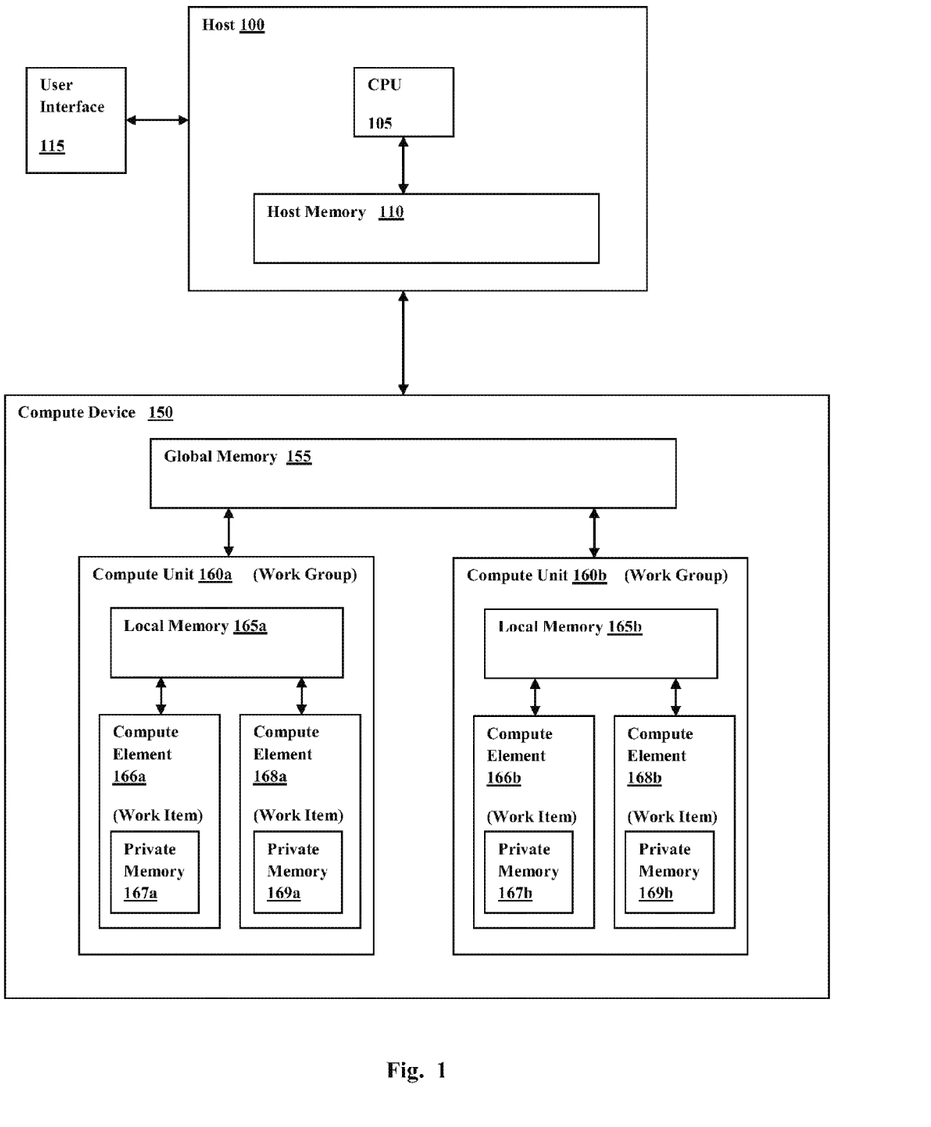
FIG. 1 illustrates an example system for implementing a kernel functionality checker.

FIG. 1 illustrates an example system for implementing a kernel functionality checker. A host 100 with CPU (central processing unit) 105 and host memory 110 communicates with a user interface 115 (e.g., a display monitor with keyboard) and is interfaced to one or more compute devices 150 each of which may be, for example, a CPU (graphics processing unit). The host 100 runs a standard operating system that communicates with the compute device 150 via a device-specific driver. The compute device 150 may be referred to as an OpenCL device when the host communicates with it via an OpenCL driver. The compute device 150 is made up of a global memory 155 and a plurality of compute elements (also sometimes referred to as cores or processing elements) that are grouped into a plurality of compute units 160. FIG. 1 shows two such compute units 160a and 160b having local memories 165a and 165b, respectively. Compute unit 160a incorporates compute elements 166a and 168a having private memories 167a and 169a, respectively, and compute unit 160b incorporates compute elements 166b and 168b having private memories 167b and 169b, respectively. All of the compute elements and the host may access the global memory 155. The local memory of a compute unit is accessible only by the compute elements belonging to that compute unit, and the private memory of a compute element is only accessible by that compute element.

An OpenCL application is made up of a host program and one or more kernels. A kernel is the basic unit of executable code in OpenCL. The host program runs on the host, while each kernel is executed by a single compute element. The kernels, or threads, may be executed concurrently by the compute elements to provide parallel processing of data. The host program deploys a kernel for execution on an OpenCL device via an OpenCL API which compiles the kernel source code and runs the kernel via an OpenCL device driver. An integer index space is created where each instance of the kernel executed by a compute element is assigned a point in the index space. Each instance of an executing kernel a called a work item which is identified by its coordinates in the index space, referred to as the global ID for the work item. Each of the concurrently executing work items uses the same sequence of instructions as defined by a single kernel. The behavior of the work items may vary, however, because of different data selected by the code using different global IDs and because of conditional branch statements within the code that may be affected by different data. Each work item is executed by a compute element, and work items are further organized into work groups with each work group executed by a compute unit. Work items belonging to the same work group thus have access to the local memory of the compute unit associated with the work group.

Kernel Functionality Checker

Figure 2:
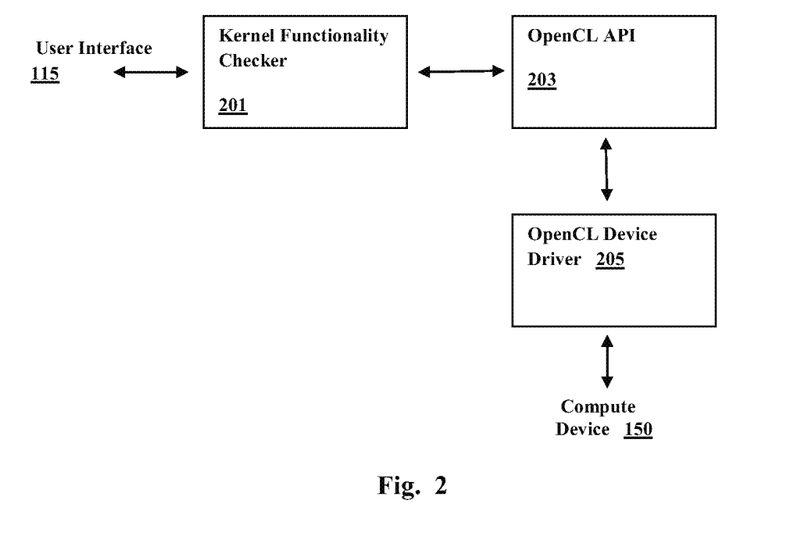
FIG. 2 the interfaces between the soft are components in an example kernel functionality checker.

FIG. 2 illustrates the interfaces between the software components in an example kernel functionality checker. The kernel functionality checker 201 communicates with the user interface 115 and interfaces with the OpenCL API 203. The OpenCL API 203 compiles and runs microkernels deployed from the kernel functionality checker on the compute device 150 via OpenCL driver 205.

Figure 3:
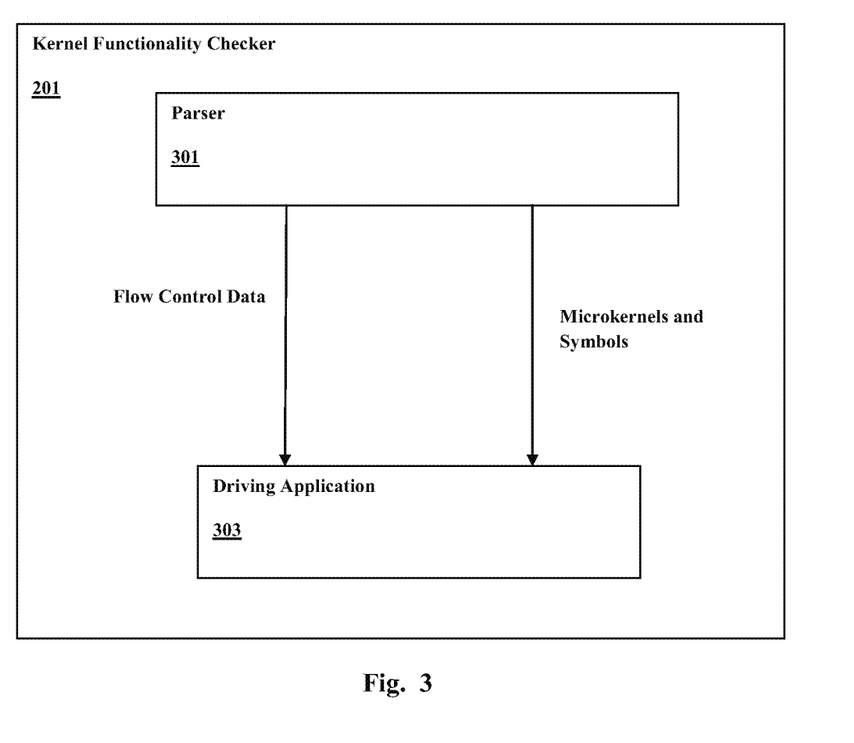
FIG. 3 illustrates the basic operation of a parser and driving application of the kernel functionality checker in one embodiment.

FIG. 3 illustrates the basic operation of the parser 301 and driving application 303 of the kernel functionality checker in one embodiment. The parser takes an OpenCL kernel as input, and outputs information for 1) microkernels and symbols, and 2) flow control. The microkernels and symbols contain information for the individual executable statements of the input kernel which will be stepped through as well as information to extract the values of variables used in those statements. The flow control data contains information relating to the order in which the microkernels are to be executed and information for use in stepping through statements of the input kernel. The driving application consumes the parser output and provides a programming interface for line-by-line debugging. Such debugging activities may include, for example, stepping into lines of the OpenCL kernel code, executing each line independently, and obtaining the results of all variables defined in the entire kernel. A more detailed description of the kernel functionality checker for debugging OpenCL kernels according to one embodiment follows.

The microkernel and symbol information outputted by the parser may be divided into three categories: microkernels (executable OpenCL kernels), microkernel arguments (in global memory space), and microkernel variables (in private/local memory space). A microkernel is an OpenCL kernel which loads global memory into private and local memory, runs a single OpenCL statement, and copies the results back to global memory. Each of these microkernels may be run independently, thus allowing the user to step over and see the results before and after individual OpenCL statements. A simple example of an OpenCL kernel is as follows:

```
1 void Copy(
2     _global float4 *in,
3     _global float *out )
4 {
5     int gid = get_global_id[0];
6     out[gid] = in[gid];
7 }
```

A character string representing this code is input to the parser from which the parser would generate the following microkernels:

```
_kernel void Copy_LINE0001(
    _global float4 *in,
    _global float4 *out,
    _global int* INT_SYMBOLS)
{
    int gid = INT_SYMBOLS[0];
    gid = get_global_id[0];
    INT_SYMBOLS[0] = gid;
}
and
_kernel void Copy_LINE0002(
    _global float4 *in,
    _global float4 *out,
    _global int* INT_SYMBOLS)
{
    int gid = INT_SYMBOLS[0];
    out[gid] = in[gid];
    INT_SYMBOLS[0] = gid;
}
```

The resulting microkernels are able to execute all the functional statements of the original kernel, but each statement is in an independent kernel. The microkernel arguments include the arguments from the original kernel as well as appended arguments which are used to contain intermediate values of variables in private and local memory spaces. The microkernel variables are contained within the microkernels themselves, but their values are copied to and from global memory, and a mapping is provided in order to access and modify their values.

As discussed earlier, private and local memory variables are ordinarily inaccessible from the host application, but their values may be copied both to and from global memory using microkernels. The resulting global memory values may then be directly accessed and modified. Private memory consists of uniform arguments to OpenCL kernels and variables which are initialized inside of the OpenCL kernel, and private variables are specific to single global work items. Referring to the microkernel Copy_LINE0001 listed above, the mapping from private to global memory is achieved by first appending an argument to the original arguments, which is a buffer of integers, denoted INT_SYMBOLS, and indexing into that buffer to determine the value to initialize into or read out from private memory. The initialization occurs before the individual executable OpenCL statement, and the read out is performed afterwards. The statement itself is essentially unmodified, with the exception of removing the type declaration, which is necessary to ensure that no variables are re-declared. For private variables of multiple different types, multiple global buffer arguments are appended to the buffer, and for multiple private variables of the same type, new offsets are added to existing appended buffers.

Local memory is specified in the kernel arguments, and is specific to its respective local work item. Local memory may be handled in essentially the same way as private memory, with the exception that all items in local memory are initialized and read out. Furthermore, since the size of local memory buffers is unknown until specified by the application, this information is passed to the microkernel as a separate argument. An example microkernel with a local memory argument is as follows:

```
_global float4 *buff,
_local float4 *local,
_global int *LSIZES,
_global float4* FLOAT4_SYMBOLS)
{
    for(int i=0;i<LSIZES[0];i++) {local[i]=FLOAT4_SYMBOLS[0+i];}
    buff = local[0]*local [5]*local[10];
    for(int i=0;i<LSIZES[0];i++) {FLOAT4_SYMBOLS[0+i]=local[i];}
}
```

The local variable in this case is of type float4, so its information is held in the global buffer FLOAT4_SYMBOLS. It is designated with an offset within the buffer (in this case, zero) and looped over all values to copy its entire contents from and to global memory. Copying to and from global and private/local memory may be costly in terms of computational overhead, especially with many private variables and large local memory buffers. To avoid this, in one embodiment, the kernel functionality checker determines which private/local variables are accessed in the microkernel statement and initializes and reads out only the variables which are accessed.

In order to interface with the driving application, the parser may include information about the microkernel arguments and the variables which reside in which offsets of those arguments when creating the microkernel code. For example in the microkernel Copy_LINE0001 listed above, the parser needs to return that the INT_SYMBOLS argument has been appended to the microkernel and that the variable "gid" resides in the INT_SYMBOLS buffer at zero index. Accordingly, in one embodiment, the parser passes to the driving application: the microkernel code string, a data structure specifying each appended argument, and data structures specifying the private/local memory variables which may be accessed from the driving application along with their respective appended buffer arguments and indexes. In one embodiment, the data structures are defined as C++ classes. For example, a class may be defined where an instance of the class is created for every buffer argument with members that include: the data type of the argument, the index of the argument in the microkernel, the size of the buffer, and the number of symbols contained in this argument. The class may be sub-classed in the driving application so that, for example, the actual buffer (i.e., a cl_mem object in OpenCL), a pointer to the actual data, and methods to access individual members may be added as a members. Another class may be defined that is instantiated for every private/local variable, the members of which include the data type, the memory space of the variable in the original OpenCL kernel, the string representation of the variable derived from the original OpenCL code, the offset into the buffer where the variable's information is stored, the size of the variable, the scope of the variable, and a pointer to the instance of the class representing the buffer argument which contains the variable.

Some OpenCL kernel statements such as if/else statements and loops may not be able to be converted into individual microkernels as simply as was done in the examples above. To handle these types of kernel statements, in one embodiment, the parser generates evaluating microkernels that evaluate the conditionals in the kernel statement and creates a flow control data structure derived from the input kernel that specifies the order in which the microkernels of the input kernel are to be executed in dependence upon the results of the evaluating microkernels. For example, in the case of an if/else statement, the conditional of the input kernel statement is evaluated and the result stored to global memory. The driving application then accesses this result and the flow control data structure to step to the next functionally correct next microkernel. Loops (e.g., for/while loops) may be converted into statements and conditionals so that a. "for" loop becomes a series of three statements: a loop variable initialization step, the conditional evaluation, and an operation on the loop variable (usually an increment/decrement). Again, the conditional evaluation simply copies the result of the conditional statement to global memory, and the driving application uses that value in accordance with the defined flow control to determine the next microkernel to execute.

In one embodiment, the flow control data structure provides: 1) which kernel lines to execute and in what order, 2) which work items have dependencies on others (for memory synchronization), and 3) a mapping from the line-by-line execution and the actual inputted OpenCL code. In one embodiment, the flow control data structure may be a list of flow control statements, each of which corresponds to a microkernel and is a C-type structure (C struct) defined as follows:

```
typedef struct OCL_DBG_Statement {
    unsigned int uKernelID;
    char *uKernelName
    unsigned int fileLine;
    unsigned int scopeDepth;
    unsigned int barrierType;
    int nextTrue;
    int nextFalse;
}
``` where uKernelID is unique identifier for the statement, uKernelName is the string representing the corresponding microkernel name, fileLine is the corresponding line number in the original input kernel, scopeDepth is the depth of scope of this statement, barrierType is a specified memory barrier, nextTrue is the next statement to execute if condition is true (−1 to terminate), and nextFalse is the next statement to execute if condition is false (−1 to terminate). The driving application steps through the flow control statements of the flow control data structure in order to determine the order in which microkernels are to be executed. To illustrate, an example of the operation of the flow control data structure in the case of a branch (e.g. an "if" statement) is given below. In this example, a particular OCL_DBG_Statement instance is shown as a tuple:

```
(<uKernelID>, <uKernelName>, <fileLine>, <scopeDepth>,
<barrierType>, <nextTrue>, <nextFalse>)
```

The following kernel tests whether a float number is greater than either of two thresholds where threshold2=threshold1:

```
1    _kernel void Threshold12(
2        _global float *values,
3        _global int *passed,
4        float threshold1,
5        float threshold2)
```

```
        6   {
        7       int gid = get_global_id[0];
        8
        9       if (values[gid]>threshold1)
        10          passed[gid] = 1;
        11      else if (values[gid]>threshold2)
        12          passed[gid] = 2;
        13      else
        14          passed[gid] = 0;
        15  }
```

The generated microkernels are:

```
            _global int *passed,
            float threshold1,
            float threshold2,
            _global int* INT_SYMBOLS,
            _global int* CONDITIONAL)
{
    INIT_SYMS;
    gid = get_global_id[0];
    READOUT_SYMS;
}
_kernel void Threshold12_LINE0002(_global float *values,
            _global int *passed,
            float threshold1,
            float threshold2,
            _global int* INT_SYMBOLS,
            _global int* CONDITIONAL)
{
    INIT_SYMS;
    CONDITIONAL[0] = (int)(values[gid]>threshold1);
    READOUT_SYMS;
}
_kernel void Threshold12_LINE0003(_global float *values,
            _global int *passed,
            float threshold1,
            float threshold2,
            _global int* INT_SYMBOLS,
            _global int* CONDITIONAL)
{
    INIT_SYMS;
    passed[gid] = 1;
    READOUT_SYMS;
}
_kernel void Threshold12_LINE0004(_global float *values,
            _global int *passed,
            float threshold1,
            float threshold2,
            _global int* INT_SYMBOLS,
            _global int* CONDITIONAL)
{
    INIT_SYMS;
    CONDITIONAL[0] = (int)(values[gid]>threshold2);
    READOUT_SYMS;
}
_kernel void Threshold12_LINE0005(_global float *values,
            _global int *passed,
            float threshold1,
            float threshold2,
            _global int* INT_SYMBOLS,
            _global int* CONDITIONAL)
{
    INIT_SYMS;
    passed[gid] = 2;
    READOUT_SYMS;
}
_kernel void Threshold12_LINE0006(_global float *values,
            _global int *passed,
            float threshold1,
            float threshold2,
            _global int* INT_SYMBOLS,
            _global int* CONDITIONAL)
{
    INIT_SYMS;
    passed[gid] = 0;
    READOUT_SYMS;
}
```

The resulting flow control statements in the flow control data structure are:

```
(1,Threshold12_LINE0001,7,0,0,2,2)    %% gid = get_global_id[0];
(2,Threshold12_LINE0002,9,0,0,3,4)    %% CONDITIONAL[0] =
                                         int)(values[gid]>threshold1);
(3,Threshold12_LINE0003,10,1,0,-1,-1) %% passed[gid] = 1;
(4,Threshold12_LINE0004,11,0,0,5,6)   %% CONDITIONAL[0] =
                                         (int)(values[gid]>threshold2);
(5,Threshold12_LINE0005,12,1,0,-1,-1) %% passed[gid] = 2;
(6,Threshold12_LINE0006,14,1,0,-1,-1) %% passed[gid] = 0;
```

The statements within each conditional have a depth one greater than their conditional evaluation, and all terminate since there is no other statement after the entire if/else block. Looping works essentially in the same way by evaluating conditionals and determining the next statement to execute.

The driving application communicates with a user via the user interface. In various embodiments, the driving application allows a user to select an OpenCL file to debug, select an OpenCL device on which to debug, specify global and local workgroup sizes, select a current work item as well as workgroup, and/or specify subsets of work items and workgroups. Variables may be accessed by name, where OpenCL private, local, and global variables, as well as locally declared variables, are accessible by name when their scope is entered and where only variables accessible by the currently selected work item are accessible. The user may be able to set or view variables, execute a full execution of the input code that runs all OpenCL microkernels from start to finish, and/or proceed through the code line by line. The viewed line in the OpenCL code corresponding to the current step may be highlighted. Stepping functionality may be provided that extends to the currently selected work item, the currently selected workgroup, a specified subset of work items, a specified subset of workgroups, or all work items. The input code may able to be run without stopping at each line, where the functionality extends to the currently selected work item, the currently selected workgroup, a specified subset of work items, a specified subset of workgroups, or all work items. The driving application may allow setting of break points where a break point is specified as a line number in the original OpenCL kernel file, where a break point stops execution of any work item which reaches it and reverts that work item to line-by-line debugging functionality, and where a work item reaches a break point if it reaches any microkernel was parsed out of the same line in the OpenCL file.

Figure 4:
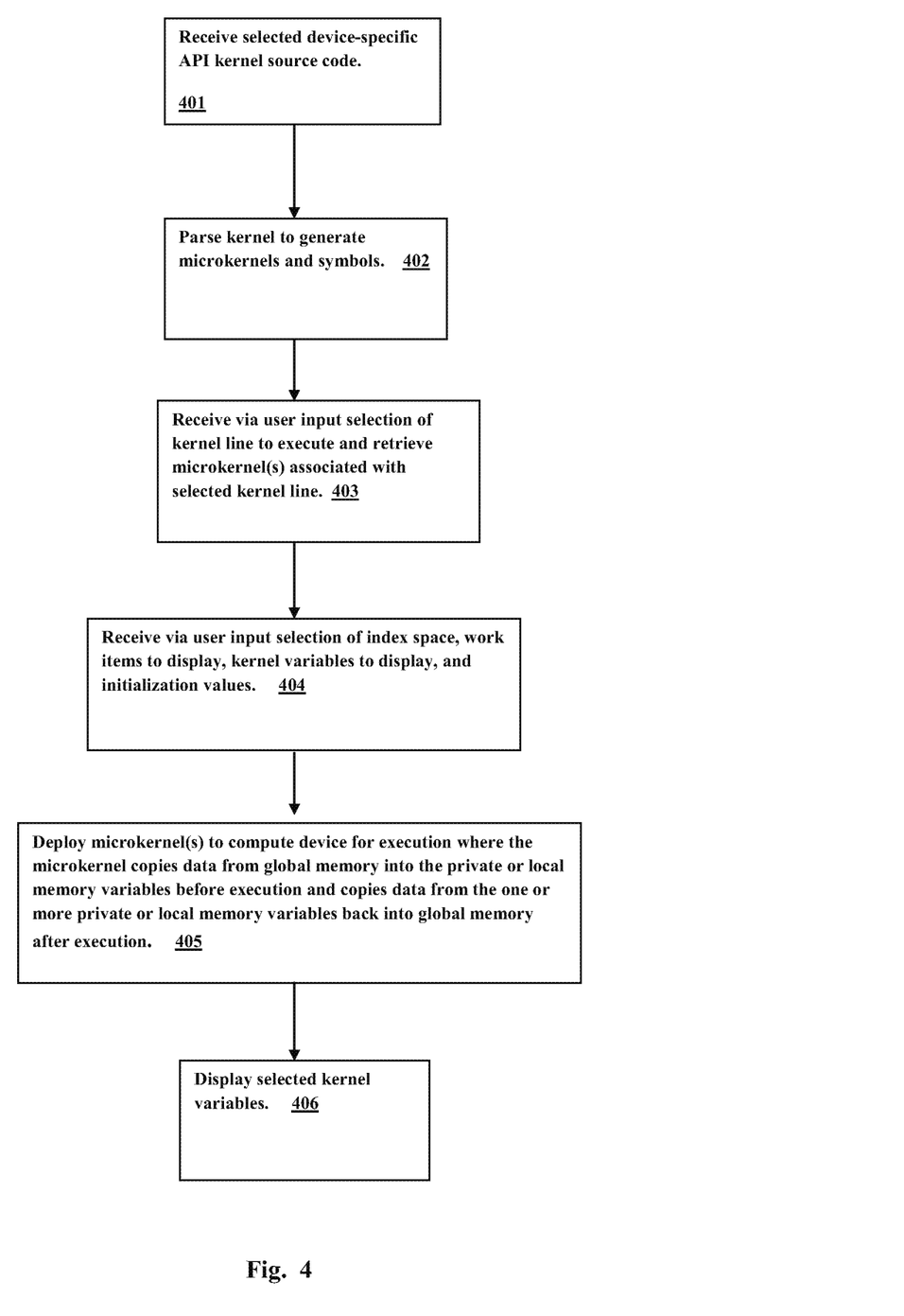
FIG. 4 shows an example of a method performed by the keel functionality checker.

FIG. 4 shows an example of a method performed by the kernel functionality checker in carrying out a line-by-line kernel debugging procedure for a device-specific API such as OpenCL. The kernel source code is received at 401, and parsed to generate microkernel(s) and symbols at 402. At 403, a kernel line to execute is received via user input, and the microkernel(s) associated with selected kernel line is retrieved. At 404, the selected index space, work items to display, kernel variables to display, and initialization values are received via user input. At 405, the microkernel(s) is deployed to the compute device for execution, where the microkernel copies data from global memory into the private or local memory variables before execution and copies data from the one or more private or local memory variables back into global memory after execution. At 406, the values of the selected variables are displayed.

Figure 5:
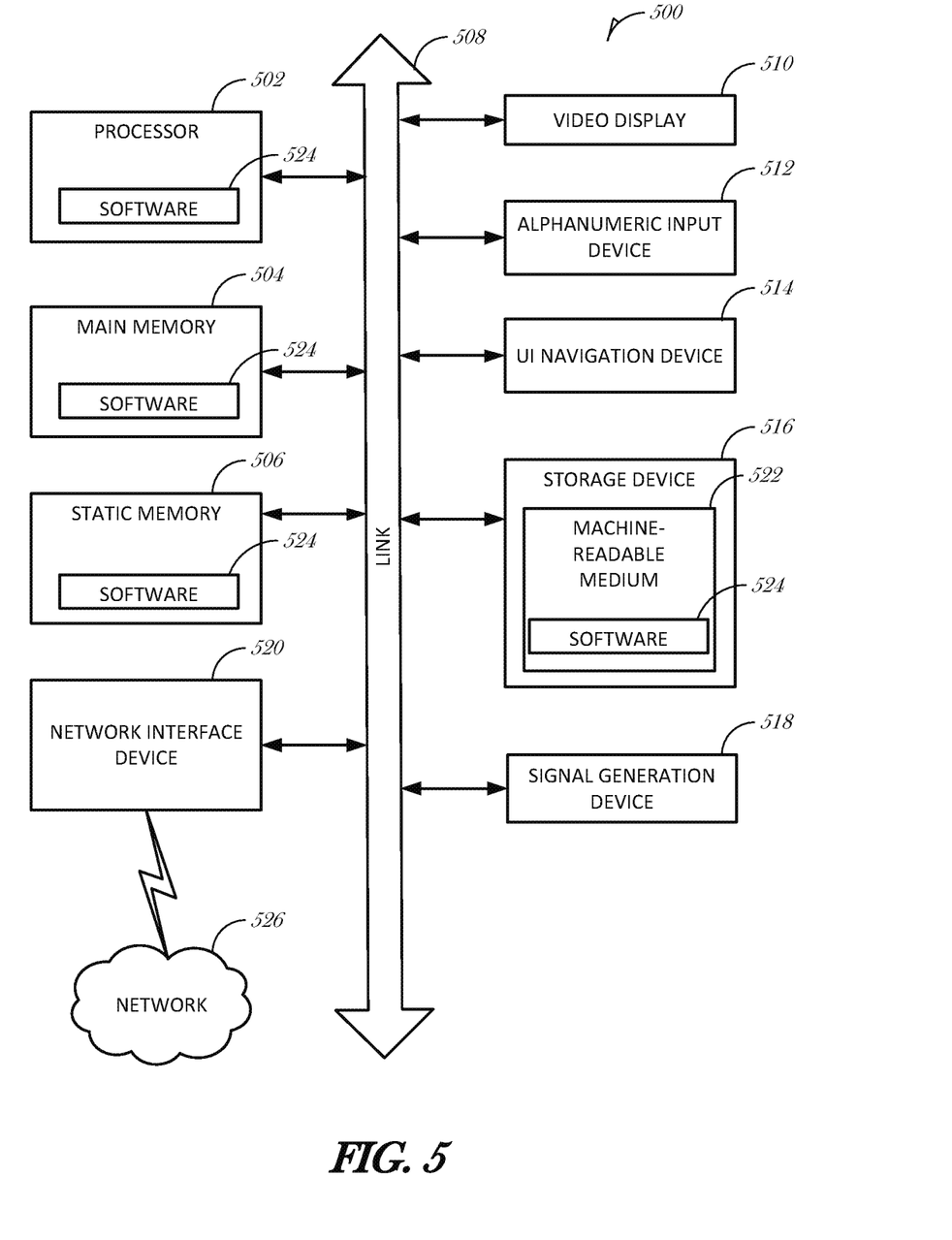
FIG. 5 is a block diagram illustrating an example machine upon which any one or more of the techniques (e.g., methodologies) discussed herein may perform, according to an example embodiment.

FIG. 5 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 521 such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage device 526 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 522 is illustrated as a single medium, the term "machine readable medium" may include a single medium or multiple media (e.g., a centralized or distributed database, and/or associated caches and servers) that arranged to store the one or more instructions 524.

The term "machine readable medium" may include any medium that is capable of storing, encoding, or carrying instructions for execution by the machine 800 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

In Example 1, a system for implementing a kernel functionality checker, comprises a host device interfaced to a compute device via a device-specific API (application programming interface); a device-specific API parser executed by the host device for receiving a device-specific API source code string of an input kernel, for parsing the string to generate one or more device-specific API executable microkernels derived from the input kernel and a driving application for sending one of more of the generated microkernels to the compute device for execution. The device-specific API executable microkernels may copy intermediate values of private or local memory variables into global memory In Example 2, the subject matter of Example 1 may optionally include wherein the microkernel includes arguments of the input kernel and appended global buffer arguments containing intermediate values of local or private memory variables of the input kernel.

In Example 3, the subject matter of Example 1 or Example 2 may optionally include wherein the device-specific API parser is further for generating a flow control data structure derived from the input kernel that specifies an execution order for the microkernels, and wherein the driving application is for sending one of more of the generated microkernels to the compute device for execution according to the order specified by the flow control data structure.

In Example 4, the subject matters of any of Examples 1 through 3 may optionally include wherein the device-specific API parser is further for generating one or more data structures for each microkernel that contain a source code string for the microkernel, each buffer argument appended to the microkernel, and the private and local variables of the input kernel that correspond to the appended arguments along with offset indices identifying where the variables are stored in the appended buffer arguments.

In Example 5, the subject matters of any of Examples 1 through 4 may optionally include wherein the microkernel executes a device-specific API statement derived from the input kernel and, for private or local memory variables of the input kernel accessed by the device-specific API statement, the microkernel copies data from global memory into the private or local memory variables before execution of the device-specific API statement and copies data from the one or more private or local memory variables back into global memory after execution of the device-specific API statement.

In Example 6, the subject matters of any of Examples 1 through 5 may optionally include wherein the microkernel copies values of private memory variables of the input kernel that are of the same type from and to an indexed global buffer argument of the microkernel with each index of the global buffer argument corresponding to a particular private memory variable.

In Example 7, the subject matters of any of Examples 1 through 6 may optionally include wherein the microkernel copies values of local memory buffers of the input kernel that are of the same type from and to an indexed global buffer argument of the microkernel with each index of the global buffer argument corresponding to a particular local memory buffer and wherein the size of the local memory buffer is passed to the microkernel as an argument.

In Example 8, the subject matters of any of Examples 1 through 7 may optionally include wherein the device-specific API parser is further for: for each conditional branching or looping statement in the input kernel, generating a condition evaluating microkernel that evaluates the condition in the statement and stores the results of the evaluation in an appended global buffer: and, generating the flow control data structure such that, after execution of the condition evaluating microkernel, the flow control data structure specifies which microkernel is to be executed next in dependence upon the results of the evaluation stored in the appended global buffer.

In Example 9, the subject matters of any of Examples 1 through 8 may optionally include wherein the device-specific API parser is further for, in the case of a conditional looping statement in the input kernel, generating microkernels for initializing a loop variable and performing operations on the loop variable as specified by the input kernel source code.

In Example 10, the subject matters of any of Examples 1 through 9 may optionally further comprise a user interface and wherein the driving application is further for receiving a selection of one or more lines of the input kernel source code via the user interface and executing those microkernels that derive from the selected lines of input kernel source code in accordance with the flow control structure.

In Example 11, the subject matters of any of Examples 1 through 11 may optionally include wherein the driving application is further for receiving a selection of one or more global, local, or private variables of the input kernel source code via the user interface and displaying the contents of microkernel buffers corresponding to the selected one or more variables.

In Example 12, the subject matters of any of Examples 1 through 11 may optionally include wherein the driving application is further for receiving selected values for one or more selected global, local, or private variables of the input kernel source code via the user interface and setting the contents of microkernel buffers corresponding to the selected one or more variables to the selected values.

In Example 13, a method performed by a host interfaced to a compute device via a device-specific API (application programming interface), comprises: receiving a device-specific API source code string of an input kernel, parsing the input string to decompose the input kernel into one or more device-specific API executable microkernels, and deploying one or more of the microkernels to a the compute device for execution.

In Example 14, the subject matters of Examples 13 may optionally include wherein the arguments of each microkernel include arguments of the input kernel and appended global buffer arguments for containing intermediate values of local or private memory variables of the input kernel.

In Example 15, the subject matters of any of Examples 13 through 14 may optionally include wherein the microkernel executes a device-specific API statement derived from the input kernel and, for private or local memory variables of the input kernel accessed by the device-specific API statement, the microkernel copies data from global memory into the private or local memory variables before execution of the device-specific API statement and copies data from the one or more private or local memory variables back into global memory after execution of the device-specific API statement.

In Example 16, the subject matters of any of Examples 13 through 15 may optionally include wherein the microkernel copies values of private memory variables of the input kernel that are of the same type from and to an indexed global buffer argument of the microkernel with each index of the global buffer argument corresponding to a particular private memory variable.

In Example 17, the subject matters of any of Examples 13 through 16 may optionally include wherein the microkernel copies values of local memory buffers of the input kernel that are of the same type from and to an indexed global buffer argument of the microkernel with each index of the global buffer argument corresponding to a particular local memory buffer and wherein the size of the local memory buffer is passed to the microkernel as an argument.

In Example 18, the subject matters of any of Examples 13 through 17 may optionally further comprise generating one or more data structures for each microkernel that contain a source code string for the microkernel, each buffer argument appended to the microkernel, and the private and local variables of the input kernel that correspond to the appended arguments along with offset indexes identifying inhere the variables are stored in the appended buffer arguments.

In Example 19, the subject matters of any of Examples 13 through 18 may optionally further comprise generating a flow control data structure derived from the input kernel that specifies an execution order for the microkernels and deploying the microkernels from the host device to the compute device according to the order specified by the flow control data structure.

In Example 20, the subject matters of any of Examples 13 through 18 may optionally further comprise: for each conditional branching or looping statement in the input kernel, generating a condition evaluating microkernel that evaluates the condition in the statement and stores the results of the evaluation in an appended global buffer; and, wherein, after execution of the condition evaluating microkernel, the flow control data structure specifies which microkernel is to be executed next in dependence upon the results of the evaluation stored in the appended global buffer.

In Example 21, the subject matters of any of Examples 13 through 19 may optionally further comprise, for the case of a conditional looping statement in the input kernel, generating microkernels for initializing a loop variable and performing operations on the loop variable as specified by the input kernel source code.

In Example 22, the subject matters of any of Examples 13 through 21 may optionally further comprise receiving a selection of one or more lines of the input kernel source code via a user interface and executing those microkernels that derive from the selected input kernel source code in accordance with the flow control structure.

In Example 23, the subject matters of any of Examples 13 through may optionally further comprise receiving a selection of one or more global, local, or private variables of the input kernel source code via the user interface and displaying the contents of microkernel buffers corresponding to the selected one or more variables.

In Example 24, the subject matters of any of Examples 13 through 2.3 may optionally further comprise receiving via the user interface an index space that specifies the number of threads to be executed when the microkernel is deployed to the compute device.

In Example 25, the subject matters of any of Examples 13 through 24 may optionally further comprise receiving via the user interface a selection of the threads of the microkernel for which microkernel buffers corresponding to the selected one or more variables are to be displayed when the microkernel is executed by the compute device.

In Example 26, the subject matters of any of Examples 13 through 25 may optionally further comprise receiving selected values for the one or more selected global, local, or private variables of the input kernel source code via the user interface and setting the contents of microkernel buffers corresponding to the selected one or more variables to the selected values.

In Example 27, the subject matters of any of Examples 13 through 26 may optionally include wherein the device-specific API is OpenCL (Open Computer Language), DirectX, or OpenGL.

In Example 28, the subject matters of any of Examples 13 through 27 may optionally include wherein the compute device is a. GPU (graphics processing unit).

Example 29 is a machine-readable medium containing instructions that, when executed, cause the machine to carry out the methods as set forth in any of Examples 13 through 28.

Example 30 is system for implementing a kernel functionality checker that comprises means for performing the methods as set forth in any Examples 13 through 28.

The above detailed description includes references to the accompanying drawings, which form a part of the detailed description. The drawings show, by way of illustration, specific embodiments that may be practiced. These embodiments are also refereed to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those document, so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for implementing a kernel functionality checker, comprising:
    a host device that includes a central processing unit and host memory;
    a compute device that includes processing circuitry and memory;
    wherein the host device is interfaced to the compute device via a device-specific API (application programming interface), wherein the device-specific API compiles kernel source code deployed by a host program into a kernel that is run on the compute device via a device-specific device driver;
    wherein the compute device comprises a plurality of compute elements that execute a plurality of instances of an input kernel concurrently with each instance of an input kernel executed by a compute element being referred to as a work item;
    wherein the compute device has a global memory accessible by both the compute device and the host device and further has private and local memories accessible only by the compute device;
    a device-specific API parser executed by the host device to receive a device-specific API source code string of an input kernel and to parse the string to generate one or more device-specific API executable microkernels from each executable statement of the input kernel source code string, wherein the generated microkernels are individually executable and are made to contain instructions that copy intermediate values of each of its private or local memory variables into global memory;
    a driving application to send the generated microkernels to the compute device for execution via the device-specific API;
    a user interface to communicate with the driving application that allows a user to control execution of the microkernels and to set or view microkernel variables;
    wherein the device-specific API parser is further to generate a flow control data structure derived from the input kernel that specifies an execution order for the microkernels and wherein the driving application is further to send one or more of the generated microkernels to the compute device for execution according to the order specified by the flow control data structure; and,
    wherein the driving application is further to allow setting of break points via the user interface where a break point is specified as a line number of the source code string of the input kernel, wherein a break point stops execution of any work item which reaches the break point and reverts that work item to line-by-line debugging functionality for statements of a microkernel, and wherein a work item reaches a break point if the work item reaches any microkernel parsed out of a line of the source code string of the input kernel with a line number specified as a break point.

2. The system of claim 1 wherein a microkernel includes arguments of the input kernel and appended global buffer arguments containing intermediate values of local or private memory variables of the input kernel.

3. The system of claim 1 wherein the device-specific API parser is further for generating one or more data structures for each microkernel that contain a source code string for the microkernel, each buffer argument appended to the microkernel, and the private and local variables of the input kernel that correspond to the appended arguments along with offset indices identifying where the variables are stored in the appended buffer arguments.

4. The system of claim 1 wherein a microkernel executes a device-specific API statement derived from the input kernel and, for private or local memory variables of the input kernel accessed by the device-specific API statement, copies data from global memory into the private or local memory variables before execution of the device-specific API statement and copies data from the one or more private or local memory variables back into global memory after execution of the device-specific API statement.

5. The system of claim 1 wherein a microkernel copies values of private memory variables of the input kernel that are of the same type from and to an indexed global buffer argument of the microkernel with each index of the global buffer argument corresponding to a particular private memory variable.

6. The system of claim 1 wherein a microkernel copies values of local memory buffers of the input kernel that are of the same type from and to an indexed global buffer argument of the microkernel with each index of the global buffer argument corresponding to a particular local memory buffer and wherein the size of the local memory buffer is passed to the microkernel as an argument.

7. The system of claim 1 wherein the device-specific API parser is further for:
    for each conditional branching or looping statement in the input kernel, generating a condition evaluating microkernel that evaluates the condition in the statement and stores the results of the evaluation in an appended global buffer; and,
    generating the flow control data structure such that, after execution of the condition evaluating microkernel, the flow control data structure specifies which microkernel is to be executed next in dependence upon the results of the evaluation stored in the appended global buffer.

8. The system of claim 7 wherein the device-specific API parser is further for, in the case of a conditional looping statement in the input kernel, generating microkernels for initializing a loop variable and performing operations on the loop variable as specified by the input kernel source code.

9. The system of claim 7 wherein the driving application is further for receiving a selection of one or more lines of the input kernel source code via the user interface and executing those microkernels that derive from input kernel source code in accordance with the flow control structure.

10. The system of claim 9 wherein the driving application is further for receiving a selection of one or more global, local, or private variables of the input kernel source code via the user interface and displaying the contents of microkernel buffers corresponding to the selected one or more variables.

11. The system of claim 9 wherein the driving application is further for receiving selected values for one or more selected global, local, or private variables of the input kernel source code via the user interface and setting the contents of microkernel buffers corresponding to the selected one or more variables to the selected values.

12. A method for checking the functionality of a device-specific API (application programming interface), comprising:

operating a host device interfaced to a compute device via the device-specific API (application programming interface), wherein the device-specific API compiles kernel source code deployed by a host program into a kernel that is run on the compute device via a device-specific device driver;

wherein the compute device has a global memory accessible by both the compute device and the host device and further has private and local memories accessible only by the compute device;

wherein the compute device comprises a plurality of compute elements that execute a plurality of instances of an input kernel concurrently with each instance of an input kernel executed by a compute element being referred to as a work item;

executing a device-specific API parser at the host device that receives a device-specific API source code string of an input kernel and parses the string to generate one or more device-specific API executable microkernels from each executable statement of the input kernel source code string, wherein the generated microkernels are individually executable and are made to contain instructions that copy intermediate values of each of its private or local memory variables into global memory;

executing a driving application at the host device that sends the generated microkernels to the compute device for execution via the device-specific API;

communicating with the driving application via a user interface that allows a user to control execution of the microkernels and to set or view microkernel variables;

executing the device-specific API parser to generate a flow control data structure derived from the input kernel that specifies an execution order for the microkernels and executing the driving application to send one or more of the generated microkernels to the compute device for execution according to the order specified by the flow control data structure; and, set one or more break points via the user interface where a break point is specified as a line number of the source code string of the input kernel, wherein a break point stops execution of any work item which reaches the break point and reverts that work item to line-by-line debugging functionality for statements of a microkernel, and wherein a work item reaches a break point if the work item reaches any microkernel parsed out of a line of the source code string of the input kernel with a line number specified as a break point.

13. The method of claim 12 wherein the arguments of a microkernel include arguments of the input kernel and appended global buffer arguments for containing intermediate values of local or private memory variables of the input kernel.

14. The method of claim 12 wherein a microkernel copies values of private memory variables of the input kernel that are of the same type from and to an indexed global buffer argument of the microkernel with each index of the global buffer argument corresponding to a particular private memory variable.

15. The method of claim 12 further comprising generating one or more data structures for each microkernel that contain a source code string for the microkernel, each buffer argument appended to the microkernel, and the private and local variables of the input kernel that correspond to the appended arguments along with offset indexes identifying where the variables are stored in the appended buffer arguments.

16. The method of claim 12 further comprising:

for each conditional branching or looping statement in the input kernel, generating a condition evaluating microkernel that evaluates the condition in the statement and stores the results of the evaluation in an appended global buffer; and, wherein, after execution of the condition evaluating microkernel, the flow control data structure specifies which microkernel is to be executed next in dependence upon the results of the evaluation stored in the appended global buffer.

17. The method of claim 12 further comprising receiving a selection of one or more lines of the input kernel source code via the user interface and executing those microkernels that derive from input kernel source code in accordance with the flow control structure.

18. The method of claim 17 further comprising receiving a selection of one or more global, local, or private variables of the input kernel source code via the user interface and displaying the contents of microkernel buffers corresponding to the selected one or more variables.

19. The method of claim 18 further comprising receiving via the user interface an index space that specifies the number of threads to be executed when a microkernel is deployed to the compute device.

20. The method of claim 18 further comprising receiving via the user interface a selection of threads of a microkernel for which microkernel buffers corresponding to the selected one or more variables are to be displayed when the microkernel is executed by the compute device.

21. The method of claim 18 further comprising receiving selected values for the one or more selected global, local, or private variables of the input kernel source code via the user interface and setting the contents of microkernel buffers corresponding to the selected one ore more variables to the selected values.

22. The method of claim 12 wherein the device-specific API is OpenCL (Open Computer Language).

23. A non-transitory machine-readable medium containing instructions that, when executed, cause a machine to carry out the method recited by claim 12.

* * * * *

UNITED STATES PATENT AND TRADEMARK OFFICE
CERTIFICATE OF CORRECTION

PATENT NO. : 9,442,826 B2  
APPLICATION NO. : 13/995734  
DATED : September 13, 2016  
INVENTOR(S) : Bottleson et al.

It is certified that error appears in the above-identified patent and that said Letters Patent is hereby corrected as shown below:

On the Title Page

In Column 2, under "Foreign Patent Documents", Line 1, delete "102007010943 A" and insert --1020070109432 A--, therefor Signed and Sealed this
Thirteenth Day of March, 2018

Andrei Iancu
*Director of the United States Patent and Trademark Office*